J. H. BLOOM.
MANURE SPREADER.
APPLICATION FILED FEB. 20, 1909.
943,731.
Patented Dec. 21, 1909.
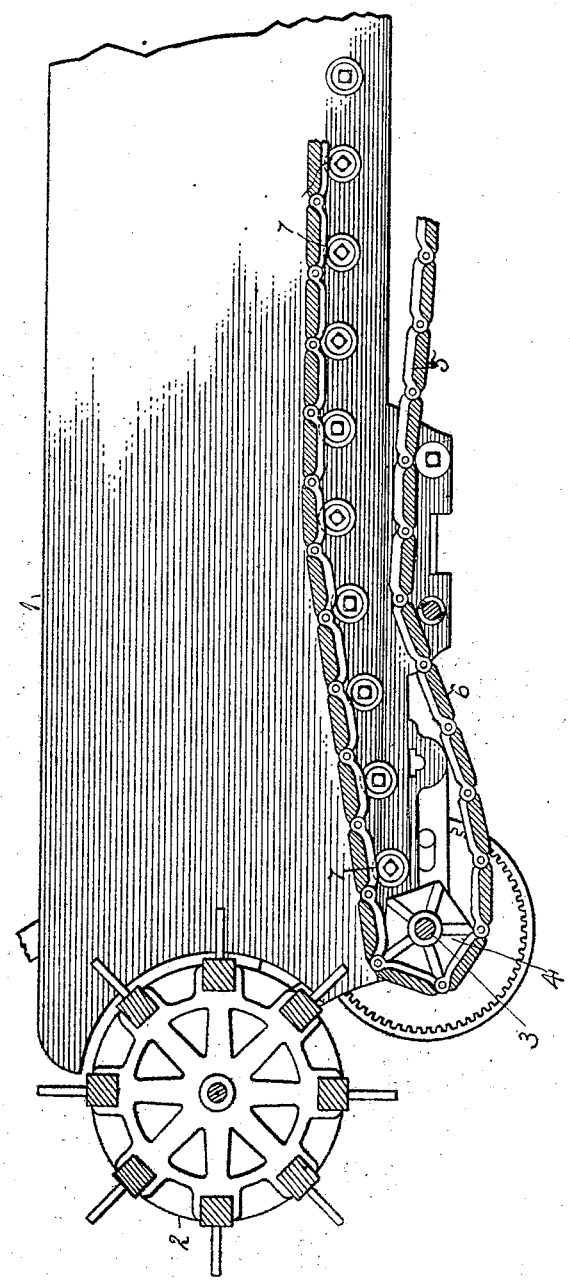
Witnesses:
W. L. Dow
E. Behel
Inventor:
Joseph H. Bloom
By A. O. Behel
Atty.

UNITED STATES PATENT OFFICE.

JOSEPH H. BLOOM, OF FREEPORT, ILLINOIS.

MANURE-SPREADER.

943,731.

Specification of Letters Patent. Patented Dec. 21, 1909.

Application filed February 20, 1909. Serial No. 479,279.

*To all whom it may concern:*

Be it known that I, JOSEPH H. BLOOM, a citizen of the United States, residing at Freeport, in the county of Stephenson and State of Illinois, have invented certain new and useful Improvements in Manure-Spreaders, of which the following is a specification.

The object of this invention is to form the traveling platform with a downward inclination at its delivery end in order that the manure, before it reaches the distributing head will be loosened and broken up so that the head will more readily take it and distribute it.

In the accompanying drawings is shown a vertical lengthwise section of the delivery end of the box.

The box of the manure spreader comprises the sides 1 and ends not shown. The sides support a distributing head 2 which is rotated by having a driving connection with the ground wheels.

A shaft 3 is supported by the sides and supports two heads 4 over which the endless chains 5 pass, and to the links of these chains are connected slats 6 forming a movable floor or bottom to the box. Rollers 7 are supported by the sides of the box and over which the upper section of the endless chains 5 pass and act as a support for the floor or bottom. A section of the floor or bottom adjacent to the distributing head 2 is inclined downward from the level of the main section of the floor to the distributing head. The object in thus inclining the floor is to force the manure to fall loosely toward the distributing head by which arrangement the manure will be presented in better shape for the distributing head to take it up.

I claim as my invention.

The combination of a box of a manure spreader, a movable floor, supports for the floor, and a distributing head located adjacent to the delivery end of the box, the support for the floor comprising a substantially horizontal portion and a declining portion, the declining portion located between the horizontal portion and the distributing head, the floor conforming to the supports whereby the mass of material to be distributed is broken up and delivered to the distributing head.

In testimony whereof I have hereunto set my hand in presence of two subscribing witnesses.

JOSEPH H. BLOOM.

Witnesses:
A. O. BEHEL,
E. D. E. N. BEHEL.